United States Patent [19]

Occelli

[11] Patent Number: 4,615,996

[45] Date of Patent: Oct. 7, 1986

[54] DUAL FUNCTION CRACKING CATALYST (DFCC) COMPOSITION

[75] Inventor: Mario L. Occelli, Allison Park, Pa.

[73] Assignee: Gulf Research & Development Company, Pittsburgh, Pa.

[21] Appl. No.: 526,482

[22] Filed: Aug. 25, 1983

[51] Int. Cl.[4] .............................................. B01J 29/06
[52] U.S. Cl. ....................................... 502/65; 502/67; 502/68
[58] Field of Search ...................... 502/67, 68, 69, 65; 208/120

[56] References Cited

U.S. PATENT DOCUMENTS

| | | | |
|---|---|---|---|
| 3,816,342 | 6/1974 | Plank et al. | 502/68 X |
| 3,830,724 | 8/1974 | Schutt | 502/67 X |
| 4,239,654 | 12/1980 | Gladrow et al. | 502/67 |
| 4,414,098 | 11/1983 | Zandona et al. | 208/120 |

Primary Examiner—Carl F. Dees
Attorney, Agent, or Firm—S. R. La Paglia; Forrest D. Stine; Q. Todd Dickinson

[57] ABSTRACT

A novel catalyst composition comprising a solid cracking catalyst and a diluent containing substantially catalytically inactive crystalline aluminosilicate.

27 Claims, 1 Drawing Figure

DUAL FUNCTION CRACKING CATALYST (DFCC) COMPOSITION

BACKGROUND OF THE INVENTION

1. Field of the Invention

This invention relates to a novel catalyst composition comprising a solid cracking catalyst and a diluent containing substantially catalytically inactive crystalline aluminosilicates.

2. Description of the Invention

U.S. Pat. No. 3,944,482 to Mitchell et al. discloses a process directed to the catalytic cracking of hydrocarbon feeds containing metals using a fluid catalyst having improved metals tolerant characteristics. Bartholic in U.S. Pat. No. 4,289,605 relates to a process for the catalytic cracking of hydrocarbon feeds containing metals using a catalyst composition containing a solid cracking catalyst and calcined microspheres (for example, calcined kaolin clay) having a surface area with the range of 10 to 15 m²/gram.

SUMMARY OF THE INVENTION

I have found that catalytic cracking of high metals content feedstocks such as, for example, those containing iron, vanadium, nickel and copper can be substantially improved by contacting said charge stocks under catalytic cracking conditions with a novel catalyst composition, claimed herein, comprising a solid cracking catalyst and, as a diluent, one or more substantially catalytically inactive crystalline aluninosilicates. The improvement resides in the ability of the catalyst system to function well even when the catalyst carries a substantially high level of metal on its surface, for example, up to 5000 ppm of nickel or nickel equivalents, or even higher. By "ppm of nickel equivalent" I mean ppm nickel +0.20 ppm vanadium. Thus feedstocks having very high metals content can be satisfactorily used herein. The novel process using the novel catalyst composition defined and claimed herein is covered in my U.S. application Ser. No. 526,483, entitled "Process for Cracking High Metals Content Feedstocks", filed concurrently herewith.

The cracking catalyst component of the novel catalyst composition used in the novel process can be any cracking catalyst of any desired type having high activity. By "high activity" I mean catalyst of fresh MAT Activity above about 1.0, preferably from about 2 to about 4, where $$\text{Activity} = \frac{\text{Wt \% Conversion}}{100 - \text{Wt \% Conversion}}$$

The "MAT Activity" was obtained by the use of a microactivity test (MAT) unit similar to the standard Davison MAT (see Ciapetta et al., Oil & Gas Journal, 65, 88 (1967). All catalyst samples were tested at 900° F. (482° C.) reaction temperature; 15 weight hourly space velocity; 80 seconds of catalyst contact time; and a catalyst to oil ratio of 2.9 with 2.5 grams of catalyst. The charge stock was a Kuwait gas oil having a boiling range of 500° F. to 800° F. (260° C. to 427° C.). Inspections of this Kuwait gas oil are shown in Table I below.

TABLE I

| KUWAIT GAS OIL INSPECTIONS | |
|---|---|
| Stock Identification | MAT Feedstock |
| Inspections: | |
| Gravity, API, D-287 | 23.5 |
| Viscosity, SUS D2161, 130° F. | 94.7 |
| Viscosity, SUS D2161, 150° F. | 70.5 |
| Viscosity, SUS D2161, 210° F. | 50.8 |
| Pour Point, D97, ®F. | +80 |
| Nitrogen, wt % | 0.074 |
| Sulfur, wt % | 2.76 |
| Carbon, Res., D524, wt % | 0.23 |
| Bromine No., D1159 | 5.71 |
| Aniline Point, °F. | 176.5 |
| Nickel, ppm | <0.1 |
| Vanadium, ppm | <0.1 |
| Distillation, D1160 at 760 mm | |
| End Point, °F. | 800 |
| 5 Pct. Cond. | 505 |
| Approx. Hydrocarbon Type Analysis: Vol. % | |
| Carbon as Aromatics | 23.1 |
| Carbon as Naphthenes | 10.5 |
| Carbon as Paraffins | 66.3 |

Thus, catalytic cracking catalysts suitable for use herein as host catalyst include amorphous silica-alumina catalysts; synthetic mica-montmorillonite catalysts, provided they posses a fresh MAT activity above about 1.0, as defined, for example in U.S. Pat. No. 3,252,889 to Capell et al.; and cross-linked clays (see, for example, Vaughn et al. in U.S. Pat. Nos. 4,176,090 and 4,248,739; Vaughn et al. (1980), "Preparation of Molecular Sieves Based on Pillared Interlayered Clays"; *Proceedings of the 5th International Conference on Zeolites*, Rees, L. V., Editor, Heyden, London, pages 94-101; and Lahav et al., (1978) "Crosslinked Smectites I Synthesis and Properties of Hydroxy Aluminum Montmorillonite", *Clay & Clay Minerals*, 26, pages 107-114; Shabtai, J. in U.S. Pat. No. 4,238,364; and Shabria et al. in U.S. Pat. No. 4,216,188).

Preferably, the host catalyst used herein is a catalyst containing a crystalline aluminosilicate, preferably exchanged with rare earth metal cations, sometimes referred to as "rare earth-exchanged crystalline aluminum silicate" or one of the stabilized hydrogen zeolites. Most preferably, the host catalyst is a high activity cracking catalyst.

Typical zeolites or molecular sieves having cracking activity which can be used herein as a catalytic cracking catalyst are well known in the art. Suitable zeolites are described, for example, in U.S. Pat. No. 3,660,274 to Blazek et al., or in U.S. Pat. No. 3,647,718 to Hayden et al. The descriptions of the crystalline aluminosilicates in the Blazek et al. and Hayden et al. patents are incorporated herein by reference. Synthetically prepared zeolites are initially in the form of alkali metal aluminosilicates. The alkali metal ions are exchanged with rare earth metal ions to impart cracking characteristics to the zeolites. The zeolites are, of course, crystalline, three-dimensional, stable structures containing a large number of uniform openings or cavities interconnected by smaller, relatively uniform holes or channels. The effective pore size of synthetic zeolites is suitably between six and 15 A in diameter. The overall formula for the preferred zeolites can be represented as follows:

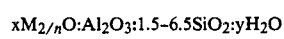

$xM_{2/n}O:Al_2O_3:1.5-6.5SiO_2:yH_2O$ where M is a metal cation and n its valence and x varies from 0 to 1 and y is a function of the degree of dehydration and varies from 0 to 9. M is preferably a rare earth metal cation such as lanthanum, cerium, praseodymium, neodymium or mixtures of these.

Zeolites which can be employed herein include both natural and synthetic zeolites. These zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, ferrierite, and the like. The faujasites are preferred. Suitable synthetic zeolites which can be treated in accordance with this invention include zeolites X, Y, A, L, ZK-4, B, EF, R, HJ, M, Q, T, W, Z, alpha and beta, ZSM-types and omega. The term "zeolites" as used herein contemplates not only aluminosilicates but substances in which the aluminum is replaced by gallium or boron and substances in which the silicon is replaced by germanium.

The preferred zeolites for this invention are the synthetic faujasites of the types Y and X or mixtures thereof.

To obtain good cracking activity the zeolites have to be in a proper form. In most cases this involves reducing the alkali metal content of the zeolite to as low a level as possible. Further, a high alkali metal content reduces the thermal structural stability, and the effective lifetime of the catalyst will be impaired as a consequence thereof. Procedures for removing alkali metals and putting the zeolite in the proper form are well known in the art as described in U.S. Pat. No. 3,537,816.

The crystalline aluminosilicate zeolites, such as synthetic faujasite, will under normal conditions crystallize as regularly shaped, discrete particles of approximately one to ten microns in size, and, accordingly, this is the size range normally used in commercial catalysts. The particle size of the zeolites can be, for example, from about 0.5 to about 10 microns but generally from about 1 to about 2 microns or less. Crystalline zeolites exhibit both an interior and an exterior surface area, with the largest portion of the total surface area being internal. Blockage of the internal channels by, for example, coke formation and contamination by metals poisoning will greatly reduce the total surface area.

Especially preferred as the catalytically active component of the catalyst system claimed herein is a crystalline aluminosilicate, such as defined above, dispersed in a refractory metal oxide matrix, for example, as set forth in U.S. Pat. No. 3,944,482 to Mitchell et al., referred to hereinabove.

The matrix material in the host catalyst can be any well-known heat-stable or refractory metal compounds, for example, metal oxides, such as silica, magnesia, boron, zirconia, or mixtures of these materials or suitable large pore clays, cross-linked clays or mixed oxide combinations.

The particular method of forming the catalyst matrix does not form a part of this invention. Any method which produces the desired cracking activity characteristics can suitably be employed. Large pored refractory metal oxide materials suitable for use as a matrix can be obtained as articles of commerce from catalyst manufacturers or they can be prepared in ways well known in the art such as described, for example, in U.S. Pat. No. 2,890,162, the specification of which is incorporated herein by reference.

The amount of the zeolitic material dispersed in the matrix can suitably be from about 10 to about 60 weight percent, preferably from about 10 to about 40 weight percent, but most preferably from about 20 to about 40 weight percent of the final catalyst. The method of forming the final composited catalyst also forms no part of this invention, and any method well known to those skilled in this art is acceptable. For example, finely divided zeolite can be admixed with the finely divided matrix material, and the mixture spray dried to form the final catalyst. Other suitable methods are described in U.S. Pat. Nos. 3,271,418; 3,717,587; 3,657,154; and 3,676,330; whose descriptions are incorporated herein by reference. The zeolite can also be grown on the matrix material if desired, as defined, for example in U.S. Pat. No. 3,647,718 to Hayden et al., referred to above.

The second component of the catalyst system defined herein, as a separate and distinct entity, is a diluent composed of one or more substantially catalytically inactive crystalline aluminosilicates. By "substantially catalytically-inactive" I mean a component of fresh MAT Activity below about 1.0, preferably from about 0.5 to about 0.9, wherein activity is defined, and MAT Activity is obtained, in the manner set forth hereinabove. Thus, examples of such substantially catalytically inactive crystalline aluminosilicates that can be used as diluent herein mentioned can be made of natural zeolites, such as mordenite, clinoptilolite, erionite, chabazite and ferrierite, and synthetic zeolites, such as the synthetic counterparts of the crystalline zeolites defined above, zeolites having the faujasite structure, the Mobil ZSM-5 structure of Mobil Oil Corporation and zeolites of the A-type of Davison Company (3A, 4A, 5A) Baltimore, Md., and Union Carbide Corporation, New York, N.Y.

The second component must be carefully selected. In order to obtain the desired results herein, it is important that its fresh surface area be in the range of about 30 to about 800 m$^2$/gram, preferably about 50 to about 700 m$^2$/gram. Equally important is the total pore volume, which must be in the range of about 0.5 to about 1.0 cc/gram, preferably about 0.05 to about 0.4 cc/gram. The particle size can vary over a wide range, but generally will be in the range of about 20 to about 150 microns, preferably about 20 to about 90 microns.

The weight ratio of the catalytically active component to the diluent (the second component) can be in the range of about 10:90 to about 90:10, preferably in the range of about 50:50 to about 85:15.

The catalyst composition defined above possesses a high tolerance to metals and thus is particularly useful in the cracking of high metals content charge stocks. Suitable charge stocks include crude oil, residuums or other petroleum fractions which are suitable catalytic cracking charge stocks except for the high metals contents. A high metals content charge stock for purposes of this invention is defined as one having a total metals concentration equivalent to or greater than a value of ten as calculated in accordance with the following relationship:

$$10[Ni]+[V]+[Fe] \geq 10$$

where [Ni], [V] and [Fe] are the concentrations of nickel, vanadium and iron, respectively, in parts per million by weight. The process is particularly advantageous when the charge stock metals concentration is equal to or greater than 100 in the above equation. It is to be understood therefore that the catalyst compositions described above can be used in the catalytic cracking of any hydrocarbon charge stock containing metals, but is particularly useful for the treatment of high metals content charge stocks since the useful life of the catalyst is increased. The charge stocks can also be derived from coal, shale or tar sands. Thus charge stocks which have a metals content value of at least about 10 in accordance with the above equation cannot be treated as well as desired economically in commercial processes today due to high catalyst make-up rates, but can now be treated utilizing the catalyst compositions described and claimed herein. Typical feedstocks are heavy gas oils or the heavier fractions of crude oil in which the metal contaminants are concentrated. Particularly preferred charge stocks for treatment using the catalyst composition of this invention include deasphalted oils boiling above about 900° F. (482° C.) at atmospheric pressure; heavy gas oils boiling from about 650° F. to about 1100° F. (343° C. to 593° C.) at atmospheric pressure; atmospheric or vacuum tower bottoms boiling above about 650° F.

The preferred method of operating a process using the catalyst composition of this invention is by fluid catalytic cracking. Hydrogen is generally not added to the reaction.

A suitable reactor-regenerator for carrying out a process using the catalyst composition is shown in the attached FIG. I. The cracking occurs in the presence of the fluidized novel catalyst composition defined herein in an elongated reactor tube 10 which is referred to as a riser. The riser has a length to diameter ratio of above 20 or above 25. The charge stock to be cracked is passed through preheater 2 to heat it to about 600° F. (315.6° C.) and is then charged into the bottom of riser 10 to the end of line 14. Steam is introduced into oil inlet line 14 through line 18. Steam is also introduced independently to the bottom of riser 10 through line 22 to help carry upwardly into the riser regenerated catalyst which flows to the bottom of the riser through transfer line 26.

The oil charge to be cracked in the riser is, for example, a heavy gas oil having a boiling range of about 650° F. to about 1100° F. (343° to 593° C.). The steam added to the riser can amount to about 10 weight percent based on the oil charge, but the amount of steam can vary widely. The catalyst employed is the novel catalyst composition defined above in a fluid form and is added to the bottom of the riser. The riser temperature range is suitably about 900° F. to about 1100° F. (482° C. to 593° C.) and is controlled by measuring the temperature of the product from the riser and then adjusting the opening of valve 40 by means of temperature controller 42 which regulates the inflow of hot regenerated catalyst to the bottom of riser 10. The temperature of the regenerated catalyst is above the control temperature in the riser so that the incoming catalyst contributes heat to the cracking reaction. The riser pressure is between about 10 and about 35 psig. Between about 0 and about 5 percent of the oil charge to the riser can be recycled. The residence time of both hydrocarbon and catalyst in the riser is very small and ranges from about 0.5 to about 5 seconds. The velocity through the riser is about 35 to about 55 feet per second and is sufficiently high so that there is little or no slippage between the hydrocarbon and the catalyst flowing through the riser. Therefore no bed of catalyst is permitted to build up within the riser whereby the density within the riser is very low. The density within the riser is a maximum of about 4 pounds per cubic foot at the bottom of the riser and decreases to about 2 pounds per cubic foot at the top of the riser. Since no dense bed of catalyst is permitted to build up within the riser, the space velocity through the riser is unusually high and will have a range between about 100 or about 120 and about 600 weight of hydrocarbon per hour per instantaneous weight of catalyst in the reactor. No significant catalyst buildup within the reactor is permitted to occur, and the instantaneous catalyst inventory within the riser is due to a flowing catalyst to oil weight ratio between about 4:1 and about 15:1, the weight ratio corresponding to the feed ratio.

The hydrocarbon and catalyst exiting from the top of each riser is passed into a disengaging vessel 44. The top of the riser is capped at 46 so that discharge occurs through lateral slots 50 for proper dispersion. An instantaneous separation between hydrocarbon and catalyst occurs in the disengaging vessel. The hydrocarbon which separates from the catalyst is primarily gasoline together with some heavier components and some lighter gaseous components. The hydrocarbon effluent passes through cyclone system 54 to separate catalyst fines contained therein and is discharged to a fractionator through line 56. The catalyst separated from hydrocarbon in disengager 44 immediately drops below the outlets of the riser so that there is no catalyst level in the disengager but only in a lower stripper section 58. Steam is introduced into catalyst stripper section 58 through sparger 60 to remove any entrained hydrocarbon in the catalyst.

Catalyst leaving stripper 58 passes through transfer line 62 to a regenerator 64. This catalyst contains carbon deposits which tend to lower its cracking activity and as much carbon as possible must be burned from the surface of the catalyst. This burning is accomplished by introduction to the regenerator through line 66 of approximately the stoichiometrically required amount of air for combustion of the carbon deposits. The catalyst from the stripper enters the bottom section of the regenerator in a radial and downward direction through transfer line 62. Flue gas leaving the dense catalyst bed in regenerator 64 flows through cyclones 72 wherein catalyst fines are separated from flue gas permitting the flue gas to leave the regenerator through line 74 and pass through a turbine 76 before leaving for a waste heat boiler wherein any carbon monoxide contained in the flue gas is burned to carbon dioxide to accomplish heat recovery. Turbine 76 compresses atmospheric air in air compressor 78 and this air is charged to the bottom of the regenerator through line 66.

The temperature throughout the dense catalyst bed in the regenerator is about 1250° F. (676.7° C.). The temperature of the flue gas leaving the top of the catalyst bed in the regenerator can rise due to afterburning of carbon monoxide to carbon dioxide. Approximately a stoichiometric amount of oxygen is charged to the regenerator, and the reason for this is to minimize afterburning of carbon monoxide to carbon dioxide above the catalyst bed to avoid injury to the equipment, since at the temperature of the regenerator flue gas some afterburning does occur. In order to prevent excessively high temperatures in the regenerator flue gas due to afterburning, the temperature of the regenerator flue gas is controlled by measuring the temperature of the flue gas entering the cyclones and then venting some of the pressurized air otherwise destined to be charged to the bottom of the regenerator through vent line 80 in response to this measurement. The regenerator reduces the carbon content of the catalyst from about $1\pm0.5$ weight percent to about 0.2 weight percent or less. If required, steam is available through line 82 for cooling the regenerator. Makeup catalyst is added to the bottom of the regenerator through line 84. Hopper 86 is disposed at the bottom of the regenerator for receiving regenerated catalyst to be passed to the bottom of the reactor riser through transfer line 26.

While in FIG. 1 it has been shown that the novel catalyst composition herein can be introduced into the system as makeup by way of line 84, it is apparent that the catalyst composition, as makeup, or as fresh catalyst, in whole or in part, can be added to the system at any desirable or suitable point, for example, in line 26 or in line 14. Similarly, the components of the novel catalyst system need not be added together but can be added separately at any of the respective points defined above. The amount added will vary, of course, depending upon the charge stock used, the catalytic cracking conditions in force, the conditions of regeneration, the amount of metals present in the catalyst under equilibrium conditions, etc.

The reaction temperature in accordance with the above described process is at least about 900° F. (482° C.). The upper limit can be about 1100° F. (593.3° C.) or more. The preferred temperature range is about 950° F. to about 1050° F. (510° C. to 565.6° C.). The reaction total pressure can vary widely and can be, for example, about 5 to about 50 psig (0.34 to 3.4 atmospheres), or preferably, about 20 to about 30 psig (1.36 to 2.04 atmospheres). The maximum residence time is about 5 seconds, and for most charge stocks the residence time will be about 1.5 to about 2.5 seconds or, less commonly, about 3 to about 4 seconds. For high molecular weight charge stocks, which are rich in aromatics, residence times of about 0.5 to about 1.5 seconds are suitable in order to crack mono- and di-aromatics and naphthenes which are the aromatics which crack most easily and which produce the highest gasoline yield, but to terminate the operation before appreciable cracking of the polyaromatics occurs because these materials produce high yields of coke and $C_2$ and lighter gases. The length to diameter ratio of the reactor can vary widely, but the reactor should be elongated to provide a high linear velocity, such as about 25 to about 75 feet per second; and to this end a length to diameter ratio above about 20 to about 25 is suitable. The reactor can have a uniform diameter or can be provided with a continuous taper or a stepwise increase in diameter along the reaction path to maintain a nearly constant velocity along the flow path. The amount of diluent can vary depending upon the ratio of hydrocarbon to diluent desired for control purposes. If steam is the diluent employed, a typical amount to be charged can be about 10 percent by volume, which is about 1 percent by weight, based on hydrocarbon charge. A suitable but non-limiting proportion of diluent gas, such as steam or nitrogen, to fresh hydrocarbon feed can be about 0.5 to about 10 percent by weight.

The catalyst particle size (of each of the two components, that is, of the catalytically-active component and of the diluent) must render it capable of fluidization as a disperse phase in the reactor. Typical and non-limiting fluid catalyst particle size characteristics are as follows:

Size (Microns) 0–20 20–45 45–75 >75
Weight percent 0–5 20–30 35–55 20–40

These particle sizes are usual and are not peculiar to this invention. A suitable weight ratio of catalyst to total oil charge is about 4:1 to about 25:1, preferably about 6:1 to about 10:1. The fresh hydrocarbon feed is generally preheated to a temperature of about 600° F. to about 700° F. (316° C. to 371° C.) but is generally not vaporized during preheat and the additional heat required to achieve the desired reactor temperature is imparted by hot, regenerated catalyst.

The weight ratio of catalyst to hydrocarbon in the feed is varied to affect variations in reactor temperature. Furthermore, the higher the temperature of the regenerated catalyst the less catalyst is required to achieve a given reaction temperature. Therefore, a high regenerated catalyst temperature will permit the very low reactor density level set forth below and thereby help to avoid back mixing in the reactor. Generally catalyst regeneration can occur at an elevated temperature of about 1250° F. (676.6° C.) or more to reduce the level of carbon on the regenerated catalyst from about 0.6 to about 1.5, generally about 0.05 to 0.3 percent by weight. At usual catalyst to oil ratios in the feed, the quantity of catalyst is more than ample to achieve the desired catalytic effect and therefore if the temperature of the catalyst is high, the ratio can be safely decreased without impairing conversion. Since zeolitic catalysts, for example, are particularly sensitive to the carbon level on the catalyst, regeneration advantageously occurs at elevated temperatures in order to lower the carbon level on the catalyst to the stated range or lower. Moreover, since a prime function of the catalyst is to contribute heat to the reactor, for any given desired reactor temperature the higher the temperature of the catalyst charge, the less catalyst is required. The lower the catalyst charge rate, the lower the density of the material in the reactor. As stated, low reactor densities help to avoid backmixing.

The reactor linear velocity while not being so high that it induces turbulence and excessive backmixing, must be sufficiently high that substantially no catalyst accumulation or buildup occurs in the reactor because such accumulation itself leads to backmixing. (Therefore, the catalyst to oil weight ratio at any position throughout the reactor is about the same as the catalyst to oil weight ratio in the charge.) Stated another way, catalyst and hydrocarbon at any linear position along the reaction path both flow concurrently at about the same linear velocity, thereby avoiding significant slippage of catalyst relative to hydrocarbon. A buildup of catalyst in the reactor leads to a dense bed and backmixing, which in turn increases the residence time in the reactor, for at least a portion of the charge hydrocarbon induces aftercracking. Avoiding a catalyst buildup in the reactor results in a very low catalyst inventory in the reactor, which in turn results in a high space velocity. Therefore, a space velocity of over 100 to 120 weight of hydrocarbons per hour per weight of catalyst inventory is highly desirable. The space velocity should not be below about 35 and can be as high as about 500. Due to the low catalyst inventory and low charge ratio of catalyst to hydrocarbon, the density of the material at the inlet of the reactor in the zone where the feed is charged can be only about 1 to less than 5 pounds per cubic foot, although these ranges are non-limiting. An inlet density in the zone where the low molecular weight feed and catalyst is charged below about 4 pounds per cubic foot is desirable since this density range is too low to encompass dense bed systems which induce backmixing. Although conversion falls off with a decrease in inlet density to very low levels, it has been found the extent of aftercracking to be a more limiting feature than total conversion of fresh feed, even at an inlet density of less than about 4 pounds per cubic foot. At the outlet of the reactor the density will be about half of the density at the inlet because the cracking operation produces about a four-fold increase in mols of hydrocarbon. The decrease in density through the reactor can be a measure of conversion.

The above conditions and description of operation are for the preferred fluid bed riser cracking operation. For cracking in the older conventional fluid bed operation or in a fixed-bed operation, the particular reaction conditions are well known in the art.

DESCRIPTION OF PREFERRED EMBODIMENTS

Figure 1:
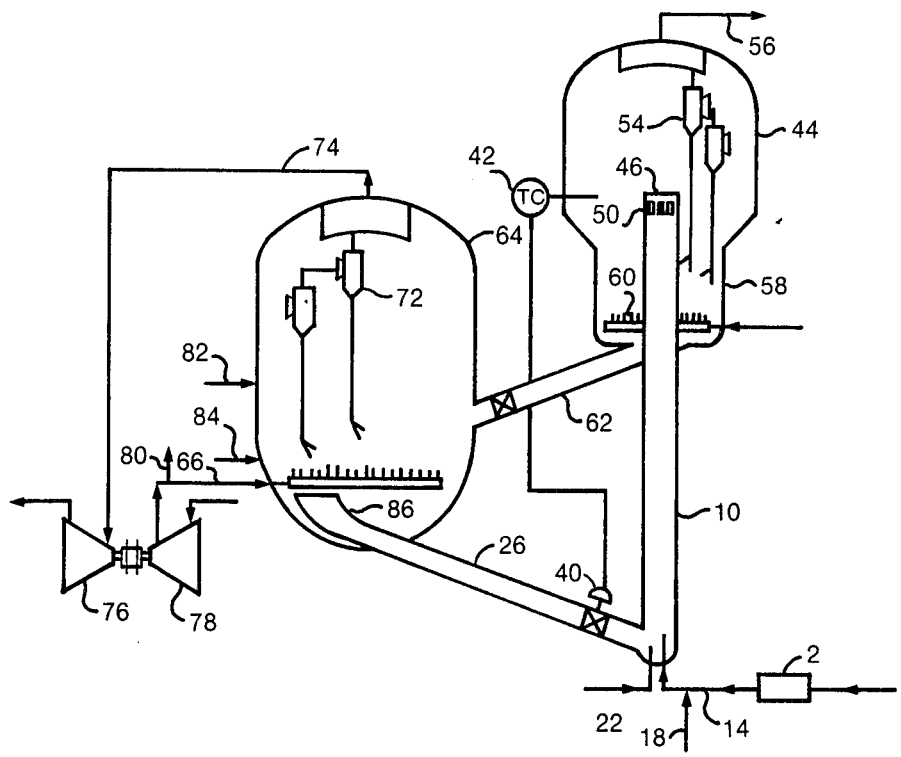

A number of runs were carried out wherein a number of catalysts were evaluated for their metals tolerance. Each was heat shocked at 1100° F. (593° C.) for one hour, contaminated with nickel and vanadium by impregnation with nickel and vanadium naphthenates, followed by calcination at 1000° F. (538° C.) for 10 hours and a steam treatment at 1350° F. (732.3° C.) with about 100 percent steam for 10 hours. The average pore radii were determined after calcination, but before the steam treatment. Each of the catalysts carried on its surface 5000 ppm of nickel equivalents (3,800 parts per million of nickel and 6,000 parts per million of vanadium).

The "MAT Activity" was obtained by the use of the microactivity test previously described. The gas oil employed was described in Table I.

The catalysts used in the test included GRZ-1 alone and physical mixtures of GRZ-1 and one of the following diluents:
Meta-kaolin
Mordenite
Clinoptilolite
Erionite
Chabazite
Ferrierite
USY
REY
ZSM-5
Calcium A
wherein the weight ratios of GRZ-1 to diluent was 60:40 or 80:20. Each of the above is defined further below:

GRZ-1—A commercial cracking catalyst containing a high zeolite content composited with a refractory metal oxide matrix.

Meta kaolin—A clay predominating in silica and alumina in a 2:1 molar ratio, such as used in in U.S. Pat. No. 4,289,605.

USY—Davison Company stabilized zeolite with faujasite structure (Z-14 USY)

REY—A rare earth exchanged zeolite with the faujasite structure

The remaining zeolites are defined, for example, by D. W. Breck in *Zeolite Molecular Sieves*, pages 201-241 and 349-374, published by Wiley and Sons, Interscience, New York, N.Y.

The surface properties of each of the above are set forth below in Table II:

TABLE II

| Catalyst | Surface Area, $m^2/g$ | Pore Volume, cc/g |
|---|---|---|
| GRZ-1 | 222 | 0.17 |
| Meta-Kaolin | 10 | 0.04 |
| Mordenite | 141 | 0.13 |
| Clinoptilolite | 89 | 0.05 |
| Erionite | 380 | 0.22 |
| Chabazite | 226 | 0.14 |
| Ferrierite | 145 | 0.10 |
| USY | 670 | 0.35 |
| REY | 650 | 0.28 |
| ZSM-5 | 385 | 0.22 |
| Calcium A | 525 | 0.30 |

The data obtained are tabluated below in Table III:

TABLE III

| Run No. | Catalyst | Conversion, Vol. % of Fresh Feed | $C_5+$ (Gasoline) Vol. % of Fresh Feed |
|---|---|---|---|
| 1 | GRZ-1 | 60.0 | 37.6 |
| 2 | Meta-Kaolin* | 49.4 | 33.8 |
| 3 | Clinoptilolite* | 63.0 | 40.8 |
| 4 | Mordenite* | 57.2 | 36.2 |
| 5 | Chabazite* | 49.9 | 32.4 |
| 6 | Chabazite** | 59.6 | 40.9 |
| 7 | Calcium A* | 50.7 | 32.9 |
| 8 | Calcium A** | 63.8 | 43.4 |
| 9 | USY* | 60.2 | 34.5 |
| 10 | REY* | 63.7 | 41.3 |

*GRZ-1 diluted with indicated additive. Resultant catalyst contained GRZ-1 and diluent in a weight ratio of 60:40.
**GRZ-1 diluted with indicated additive. Resultant catalyst contained GRZ-1 and diluent in a weight ratio of 80:20.

The unusual results obtained by operation of a catalytic cracking process using the novel catalyst composition defined herein are seen from the data in Table III above. Thus, in Run No. 1, wherein the process was operated with a commercially available high activity catalyst, which has excellent metals tolerant characteristics when used in catalytic cracking of hydrocarbonaceous feeds, excellent results were obtained, even with the catalyst carrying 5000 ppm nickel equivalents. When in Run No. 2, the zeolite catalyst of Run No. 1 was diluted with meta-kaolin in a weight ratio of 60:40, following the teachings of U.S. Pat. No. 4,289,605 of Bartholic, inferior results were obtained compared with those obtained in Run No. 1, in that conversion was reduced to 49.4, with a drop in gasoline production. However when the zeolite was combined with a substantially catalytically inactive crystalline aluminosilicate in each of Runs Nos. 3, 4, 9 and 10, conversions and/or amounts of gasoline produced were almost as good or even better than the results obtained in Run No. 1. Runs Nos. 5, 6, 7 and 8 show that the amounts of components present in the novel catalyst herein must be judiciously selected in order to obtain the desired conversion and/or improved amounts of gasoline. While a catalyst containing a high catalytically active crystalline aluminosilicate and a substantially catalytically inactive crystalline aluminosilicate in a weight ratio of 60:40 in Runs Nos. 5 and 7 did not result in superior performances, when the same components were present in a weight ratio of 80:20 in Runs Nos. 6 and 8, excellent conversions and improved gasoline production resulted.

Obviously many modifications and variations of the invention, as herein above set forth, can be made without departing from the spirit and scope thereof and, therefore, only such limitations should be imposed as are indicated in the appended claims.

We claim:

1. A novel catalytic cracking composition comprising a cracking catalyst having high activity and, as a separate and distinct entity, a diluent comprising a substantially catalytically inactive crystalline aluminosilicate having a fresh MAT Activity below about 1.

2. The novel catalytic cracking composition of claim 1 wherein said diluent has a MAT Activity from about 0.5 to about 0.9.

3. The novel catalytic cracking composition of claim 1 wherein said diluent has a surface area of about 30 to about 800 m$^2$/gram and a pore volume of about 0.05 to about 1.0 cc/gram.

4. The novel catalytic cracking composition of claim 1 wherein said diluent has a surface area of about 50 to about 700 m$^2$/gram and a pore volume of about 0.05 to about 0.4 cc/gram.

5. The novel catalytic cracking composition of claim 1 wherein said diluent is clinoptilolite.

6. The novel catalytic cracking composition of claim 1 wherein said diluent is mordenite.

7. The novel catalytic cracking composition of claim 1 wherein said diluent is chabazite.

8. The novel catalytic cracking composition of claim 1 wherein said diluent is a type A zeolite (3A, 4A, 5A).

9. The novel catalytic cracking composition of claim 1 wherein said diluent is USY.

10. The novel catalytic cracking composition of claim 1 wherein said diluent is REY.

11. The novel catalytic cracking composition of claim 1 wherein the weight ratio of said cracking catalyst to diluent is in the range of about 10:90 to about 90:10.

12. The novel catalytic cracking composition of claim 1 wherein the weight ratio of said cracking catalyst to diluent is in the range of about 50:50 to about 85:15.

13. The novel catalytic cracking composition of claim 1 wherein said cracking catalyst has a MAT activity of about 2.0 to about 4.0

14. The novel catalytic cracking composition of claim 1 wherein said cracking catalyst is an amorphous silica-alumina catalyst.

15. The novel catalytic cracking composition of claim 1 wherein said cracking catalyst is a cross-linked clay.

16. The novel catalytic cracking composition of claim 1 wherein said cracking catalyst is a synthetic mica-montmorillonite.

17. The novel catalytic cracking composition of claim 1 wherein said cracking catalyst contains a crystalline aluminosilicate.

18. The novel catalytic cracking composition of claim 1 wherein said cracking catalyst contains a stabilized hydrogen crystalline aluminum silicate.

19. The novel catalytic cracking composition of claim 1 wherein said cracking catalyst contains a rare earth-exchanged crystalline aluminum silicate.

20. The novel catalytic cracking composition of claim 1 wherein said cracking catalyst comprises from about ten to about 60 weight percent of a zeolite having cracking characteristics dispersed in a refractory metal oxide matrix.

21. The novel catalytic cracking composition of claim 1 wherein said cracking catalyst comprises from about ten to about 40 weight percent of a zeolite having cracking characteristics dispersed in a refractory metal oxide matrix.

22. The novel catalytic cracking composition of claim 1 wherein said cracking catalyst comprises from about 20 to about 40 weight percent of a zeolite having cracking characteristics dispersed in a refractory metal oxide matrix.

23. The novel catalytic cracking composition of claim 20 wherein the zeolite is a synthetic faujasite.

24. The novel catalytic cracking composition of claim 20 wherein the zeolite is at least one synthetic faujasite selected from the group consisting of type Y and type X.

25. The novel catalytic cracking composition of claim 24 wherein the X and Y zeolites are rare earth exchanged.

26. The novel catalytic cracking composition of claim 20 wherein the matrix is substantially crystalline.

27. The novel catalytic cracking composition of claim 20 wherein the matrix is substantially amorphous.

* * * * *